United States Patent [19]

Scommegna

[11] 3,911,911
[45] Oct. 14, 1975

[54] ANTI-FERTILITY DEVICE

[75] Inventor: Antonio Scommegna, Northbrook, Ill.

[73] Assignee: Michael Reese Hospital and Medical Center, Chicago, Ill.

[22] Filed: Mar. 27, 1974

[21] Appl. No.: 455,187

Related U.S. Application Data

[63] Continuation-in-part of Ser. No. 224,180, Feb. 7, 1972, which is a continuation-in-part of Ser. No. 833,472, June 16, 1969, abandoned.

[52] U.S. Cl. ................ 128/130; 128/260; 128/272; 424/19; 424/22
[51] Int. Cl.² .................... A61M 7/00; A61F 5/46
[58] Field of Search ............... 128/130, 127–129, 128/131, 260, 272; 424/14, 19, 22

[56] References Cited
UNITED STATES PATENTS

| | | | |
|---|---|---|---|
| 2,625,158 | 1/1953 | Lee et al. | 128/260 |
| 3,279,996 | 10/1966 | Long et al. | 424/14 |
| 3,312,215 | 4/1967 | Silber | 128/131 |
| 3,405,711 | 10/1968 | Bakunin | 128/130 |
| 3,454,004 | 7/1969 | Leininger et al. | 128/130 |
| 3,490,456 | 1/1970 | Kortum | 128/348 |
| 3,499,445 | 3/1970 | Reed | 128/260 |
| 3,545,439 | 12/1970 | Duncan | 128/130 |
| 3,656,483 | 4/1972 | Rudel | 128/130 |
| 3,845,761 | 11/1974 | Zaffaroni | 128/130 |

OTHER PUBLICATIONS

Journal of Endrocrinology, Vol. 10, No. 4, 1954 pages 358–362, E. D. Höhn, Direct Action of Progesterone and Certain Related Steroids on the Endometrium of The Rhesus Monkey.
Doyle et al., Anat. Rec. 160, 341 (Feb. 1968) "Retention of Progestin–Releasing Intrauterine Devices in Rats" (Abstract of Papers Presented From Platform).
Robinson Nature 206 (4979):39–41 Apr. 3, 1965, "Use of Progestagenimpregnated Sponges . . . in the Sheep."
Shipley Steroids 5 (5):699–717, May 1965, "Effectiveness of Topical Application of . . . Progestins."
Dziuk et al., Endocrinology 78:208–211 Jan. 1966 "Passage of Steroids Through Silicone Rubber".
Ringler Steroids, 1(4):341–349, April 1966, "Efficacy of Topically Applied Progestational Agents".
Taubert et al., Amer. J. Obste. Gynec., 98(1):126–127, May 1967, "Absorption of Estrogen and Progesterone by Intra-Uterine Devices".
Doyle et al., Amer. J. Obstet. Gynec., 101(4):564–568, June 15, 1968, "Preliminary Studies . . . . . of Hormone-Releasing Intrauterine Devices".
Scommegna et al., Fertility & Sterility, 21(3):201–210, Mar. 1970, "Intrauterine Administration of Progesterone by a Slow Releasing Device".
Cohen et al., Fertility & Sterility, 21(10):715–723, Oct. 1970, "The Effects of an Intracervical Steroid–Releasing Device. . . .".

Primary Examiner—Aldrich F. Medbery

[57] ABSTRACT

An anti-fertility device is provided which suppresses fertility by slow release of a progestin within the uterine cavity over an extended period of time. Specifically, the device includes a progestin-containing capsule comprising a tube having a partially permeable wall, the capsule being attached to an intrauterine device, or being an integral part of an intrauterine device.

10 Claims, 3 Drawing Figures

U.S. Patent  Oct. 14, 1975  3,911,911
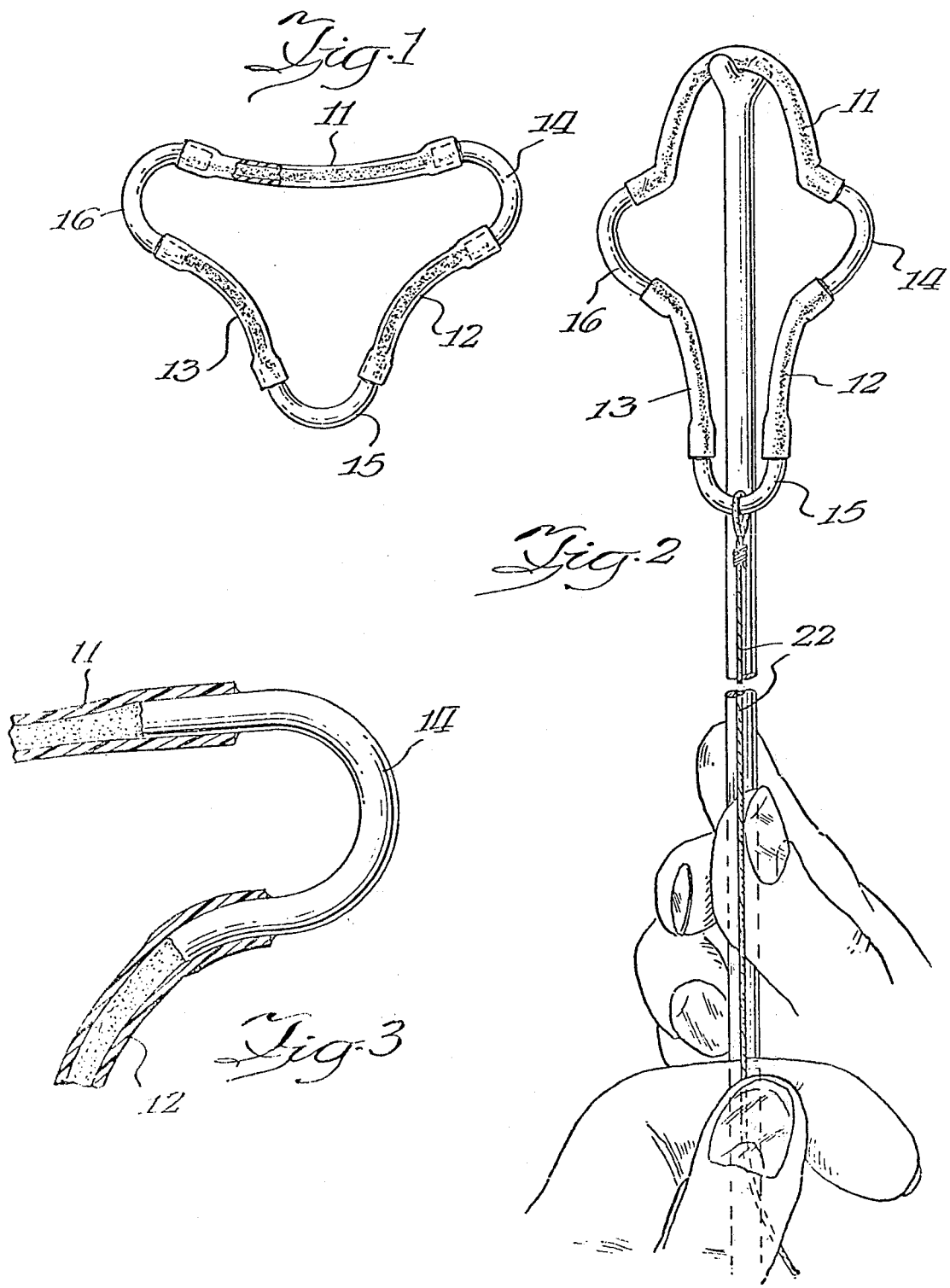

ANTI-FERTILITY DEVICE

CROSS-REFERENCE TO RELATED APPLICATION

This application is a continuation-in-part of my application Ser. No. 224,180, filed Feb. 7, 1972, which application, in turn, is a continuation-in-part of my application Ser. No. 833,472, filed June 16, 1969, now abandoned.

BRIEF SUMMARY OF THE INVENTION

Fertility in female mammals and particularly in human females is commonly suppressed either chemically by a systemically ingested progestin or mechanically by an intrauterine device which is maintained in the uterus for an extended period.

The ingestion of a progestin provides very reliable inhibition of fertility provided that the material is regularly ingested, but failures commonly occur because doses are missed by reason of forgetfulness. In addition, there are sometimes undesirable side effects produced by the presence of the progestin in the systemic circulation. Finally, the necessity of daily doses of the progestin makes continued use thereof a matter of substantial expense and sometimes prohibitive to women in poverty-stricken families.

It has been proposed to obviate the daily dosage problem by absorption systems other than oral ingestion systems, and specifically, by implanting a capsule containing a progestin in body tissue, or by inserting an annular device containing a progestin into the vagina. Such systems, however, are still systems dependent for their effect on distributing the material through the blood stream; and they are therefore subject to the same systemic side effects as those produced by oral ingestion. In addition, the maintenance of high levels of progestational compounds in the blood stream over long periods disrupts the menstrual cycle. Thus, an intra-vaginal progestin must be removed each month before a menstrual period will occur; or else the woman will be subjected to the discomfort of irregular breakthrough bleedings, or amenorrhea.

The intrauterine device of the prior art is relatively inexpensive and is not subject to human forgetfulness because it does not require daily attention, however, its use sometimes entails bleeding and it is sometimes expelled by the uterus so that it can no longer perform its function. In addition, it is only moderately reliable in that it fails to function in a significant percentage of cases, even when it has not been expelled.

In accordance with the present invention suppression of fertility is achieved by a localized chemical application and specifically by the slow release of a progestin within the uterus over an extended period of time from at least one capsule implanted and maintained within the uterine cavity. While it is not desired to be bound by any particular theory of operation, test results have shown that ovulation and the menstrual cycle are not suppressed and that slow release of a progestin within the uterus produces superficial endometrial suppression and it is believed that this effect interferes with the reproductive process by making the endometrial surface unreceptive to the implantation of the fertilized ovum.

The progestin-containing capsule of the invention is maintained within the uterine cavity by an intrauterine device to which it may be attached, or of which it may be an integral part, the latter being preferred.

BRIEF DESCRIPTION OF THE DRAWINGS

A specific embodiment of the invention is best understood by reference to the drawings, of which:

FIG. 1 shows the intrauterine device of the illustrated embodiment of the invention in its normal configuration, a small portion of one of its capsules being cut away to show its interior;

FIG. 2 shows the device as it is distorted to ease its insertion into the uterine cavity, and also indicates the manner of insertion; and FIG. 3 is an enlarged cross-sectional view of a portion of the device, to show the interior of the capsules.

DETAILED DESCRIPTION

As may be seen from the Figures, the device of this embodiment comprises three capsules 11, 12 and 13, arranged in a triangular configuration and joined together by rounded juncture pieces 14, 15 and 16.

Each of the capsules comprises a short length (about 3 centimeters) of silicone elastomer tubing containing about 30 mg. of a progestin such as norgestrel (dl-11$\beta$-ethyl-17$\alpha$-ethinyl-17$\beta$-hydrogen-4-ene-3-one). Each capsule is sealed at its ends and joined at each end to one end of one of the rounded solid juncture pieces, as clearly shown in the drawings. The juncture pieces are suitably made of resilient polyethylene. when fully assembled into the rounded triangular shape of FIG. 1, the intrauterine device has sufficient rigidity to maintain its shape when not subjected to outside forces, but still is easily flexed as required for insertion into tthe uterine cavity, as now will be described.

As shown in FIG. 2, the device is inserted into the uterus in an elongated distored position, i.e., substantially longer than its normal length and substantially narrower than its normal width. An applicator 21 having a forked end is used to engage the center of a capsule, for example, the center of capsule 11, and a string 22 is attached to the opposing juncture piece 15 so that tension may be applied to the device to distort it into the shape shown in FIG. 2. After the device is inserted into the uterine cavity, the applicator is withdrawn and the string released so that the device returns to its normal triangular shape and remains in this shape and within the uterus for as long as desired, for example, for about a year, and even longer. The string may remain attached to the intrauterine device for ease of removal of the device and for ease of inspection to make sure that the device remains in position.

Once the device is in place within the uterine cavity, the capsules slowly release the progestin therein at a rate which varies with the length of the capsules, the thickness of the capsule walls and the nature of the progestin. For norgestrel, the release rate from capsules having an inner diameter of 1,57 mm. and a wall thickness (of silicone elastomer) of 0.8 mm. is about 0.5 micrograms per day per millimeter of tubing. This amount is sufficient to achieve the desired endometrial suppression, although with other progestins both the amounts released and the amounts required may vary.

When progesterone is used as the progestin, for example, the rate of release into the uterine cavity is much higher, about 10 micrograms per day per millimeter of tubing, corresponding to about 300 micrograms per day for each capsule, or about 900 micrograms per day, total. Thus, a device containing progesterone in such capsules will have to be renewed in the uterine cavity after about three months in contrast to progestins having a slower release rate which last at least 6 months, and generally a year or more. It is preferred to renew the device about once a year even with progestins which may have longer release periods.

One particularly suitable embodiment of this invention is a modification of the T-shaped intrauterine device of U.S. Pat. No. 3,533,406. The device disclosed in said patent comprises a resilient top crossbar having a length of the order of 30 to 38 mm., corresponding to the width of the fundal portion of the endometrial cavity, and a resilient depending leg, joined to the midpoint of the crossbar, having a length from about 35 to about 40 mm. and adapted to extend toward the cervical os when the cross bar of the T lies at the fundus of the uterus. The diameter of the structural members making up the T is from about 1.5 to about 4 mm. The T-shaped intrauterine device is normally made of a pharmaceutically acceptable inert plastic material such as polyethylene.

In one modification of the T-shaped intrauterine device for this invention, a device having crossbar and depending leg members about 30 mm. in length and of about 2 mm. diameter is modified by substituting for the depending leg member, a capsule of the same length, but of greater diameter. The capsule is made of silicone elastomer tubing, has an inner diameter of 1.57 mm. and an outer diameter of 3.18 mm., providing a wall thickness of about 0.8 mm. It is filled with about 35 mg. of progesterone.

For insertion into the uterus, an insertion tube is used which resembles a plastic drinking straw and which has an external collar and flange positioned at a distance from the forward end of the tube corresponding to the distance desired in the uterus between the juncture point of the T and the opening of the cervix. The capsule serving as the depending leg member is inserted into the forward end of the tube, leaving the crossbar out of the tube. The tube is then pushed into the cervical opening with the device at the leading end; and the resilient crossbar is distorted in passage therethrough so that each arm of the crossbar forms an acute angle with the depending leg member and lies relatively flat against the exterior of the tube. As the forward end of the device enters the uterine cavity the arms of the crossbar resume their natural position substantially at right angles to the depending leg member, thereby restoring the intrauterine device to its normal T-shape. The pushing is continued until the forward end of the device reaches its desired position as indicated by the position of the collar and flange at the cervical opening. The tube is then withdrawn by simply pulling it out.

It is not essential to use a plunger in the insertion tube for proper insertion of the T-shaped intrauterine device, but it may be desirable to have a flexible rod within the tube for added stiffening to facilitate the insertion of the tube. The string attached to the juncture of the T to permit removal of the device may be attached at its opposite end to the rod within the tube during insertion to make sure that it will extend out of the cervical opening when the device is in position.

It has been found in clinical tests with progesterone-containing intrauterine T-shaped devices of this type that pregnancies are reduced to a substantially greater extent than would be expected from the mechanical action of the device. In tests in 120 patients extending over a total of 400 women-menstrual cycles with the progesterone-containing T-shaped intrauterine device, there were no pregnancies in any patient in whom the device remained in position and the capsule did not become depleted of progesterone.

There were only three pregnancies in the above-described tests, one caused by partial expulsion of the device into the cervix, one caused by depletion of the progesterone after eleven months, and one caused by depletion of the progesterone by reason of an improperly sealed capsule.

In contrast, the pregnancy rate for the T-shaped intrauterine device having only mechanical action is about 18 percent per woman-year, leading to an expectancy of about six pregnancies in 400 women-menstrual cycles.

It has also been found in tests of the device of this invention with radioactive progesterone that the progesterone locally applied to the endometrium does not enter the bloodstream as progesterone, but only as metabolites thereof.

Other suitable progestins which may be used in accordance with this invention include $17\alpha$-ethinyl-17-hydroxy-5(10)-estren-3-one, $17\alpha$-ethinyl-19-nortesterone, $6\alpha$-methyl-$17\alpha$-acetoxyprogesterone, and 6-chloro-6-dehydro-$17\alpha$-acetoxy-progesterone. In general any progestin including progesterone may be used in accordance with this invention.

As stated above, the prior art intrauterine devices sometimes cause bleeding and are sometimes involuntarily expelled from the uterus. Because these devices are dependent on their mechanical effect on the endometrial surface, their reliability in the prevention of pregnancies is greater when they are designed to contact greater areas of the endometrial surface. However, contact with more of the endometrial surface also tends to increase the irritation thereof and thereby increases the tendency for bleeding and expulsion. In contrast, the effectiveness of the intrauterine device of this invention is independent of its mechanical effect on the endometrium, permitting the use of devices of smaller effective area and therefore less tendency to produce bleeding and expulsion.

Furthermore, in the event of accidental expulsion of the device of this invention, the endometrium remains suppressed and in non-receptive condition for several days so that its anti-fertility action remains unaffected until the device can be replaced. This, of course, provides a marked advantage over the prior art mechanical intrauterine devices which are effective only when actually in place and which may prove to be ineffective if expelled from the uterus shortly before or shortly after fertilization of an ovum.

The device of this invention also has marked advantages over hormonal ingestion in that it does not require a woman to remember to take a daily pill and in that localized release of minute amounts of a progestin at the site of its desired activity is much less likely to produce undesired side effects than material ingested and acting after passage through the bloodstream.

It is to be understood that the invention is not limited to the precise configuration of the devices described above. Intrauterine devices of various configurations are known, generally involving at least one elongated member made of a resilient material and permanently held in a non-linear shape having a substantial width, said shape being resiliently elongatable to reduce its width for intrauterine insertion. Typical shapes include rings, spirals, bows, and double-S loops. Any of these shapes may be used in accordance with this invention, either by attaching a capsule to the device or, preferably, by making the device itself serve as a capsule by making the device out of silicone elastomer tubing or other resilient partially permeable tubing filled with a progestin. Devices, such as the T-shaped device, discussed above, which are designed for minimum expulsion probability rather than for maximum mechanical inhibition of pregnancies are preferred.

It is also to be understood that while silicone elastomer tubing is preferred for the capsule walls because of its proven inertness in the body, other inert materials having partial permeability may be used if desired.

For any particular inert capsule wall material a suitable diffusion rate of the progestin may be obtained from published data or from general knowledge as to which polymeric materials are generally associated with high diffusion rates and which are associated with low diffusion rates. A typical publication disclosing the diffusion rates for many substances, including steroid materials through various polymeric materials is an article by Kincl in STEROIDS, Vol. 11, pages 673–680 (May 1968). The Kincl article indicates that a number of commonly used polymeric materials have diffusion rates for steroids substantially lower than do the silicone elastomers discussed above. However, adjustment for this factor can be readily made by those skilled in the art because such diffusion processes are known to follow Fick's law and to provide diffusion rates proportioned to the area of the diffusion wall and inversely proportional to its thickness. Thus compensation can be made for an inert capsule wall material with a low diffusion rate by decreasing the wall thickness, or increasing the area of the wall, or both.

Silicone elastomers suitable for tubing in accordance with this invention are well known in the art and are described, for example, at pages 130–3 of Silicones by R. N. Meals and F. M. Lewis (Reinhold Publishing Corp., N.Y. 1959), and at pages 94–7 of *An Introduction to the Chemistry of the Silicones by Eugene G. Rochow (Second Ed., John Wiley & Sons, Inc., N.Y., 1951).*

If desired, mixtures of progestins or mixtures of a progestin and another active agent may be used to fill the capsule or capsules of the device. The capsules may also be filled with a mixture of a progestin with one or more solid diluents or absorbents, or with a progestin dissolved in a suitable liquid solvent. Alternatively where a plurality of capsules are used, as in the device of the Figures, one or two capsules may be filled with a progestin while the remaining capsule or capsules may be filled with another progestin or with another active agent.

From the foregoing, it will be apparent that numerous variations and modifications may be effected without departing from the spirit and scope of this invention.

What is claimed is:

1. A means for fertility control in a woman without suppressing ovulation comprising an intrauterine device comprising at least one hollow capsule containing a progestin within a partially permeable wall which permits release of said progestin therethrough at a rate not higher than about 900 micrograms per day, said device being made of at least one structural member coupled with said capsule and having a length many times greater than its cross-sectional width and thickness, said device having a stable external configuration prior to insertion into the uterus wherein both the width dimension and the longitudinal dimension of the device are greater than the cross-sectional thickness of any of said structural members and of a size great enough to be retained in the human uterine cavity, said device including means for permitting resilient change from said stable configuration to an unstable configuration of reduced width for insertion into the human uterine cavity.

2. The device of claim 1 wherein said progestin is progesterone.

3. The device of claim 1 wherein said capsule is a tubular capsule made of a silicone elastomer.

4. The device of claim 1 wherein said capsule is an integral structural portion of said intrauterine device.

5. The device of claim 1 wherein said capsule is an attachment to an intrauterine device which is structurally complete.

6. The device of claim 1 wherein said device is made of at least two structural members joined together and positioned out of straight line alignment to each other in said stable configuration.

7. The device of claim 1 wherein said intrauterine device comprises a single capsule which permits release of said progestin through said wall at a rate not higher than about 300 micrograms per day.

8. The method of inhibiting fertility in a human female without suppressing ovulation comprising the steps of deforming a flexible progestin-containing intrauterine device comprising at least one sealed partially permeable wall, inserting the deformed device through the vaginal orifice into the uterine cavity, releasing the device, obtaining sustained, anti-fertility action by permitting the device to expand into a stable configuration of a width and length great enough to be retained in said uterine cavity, obtaining endrometrial suppression over an extended period by permitting the progestin to be released at a rate not higher than about 900 micrograms per day, and thereafter removing said device by again deforming it and withdrawing it through the vaginal orifice.

9. The method of claim 8, wherein said progestin is progesterone.

10. The method of claim 8 wherein said partially permeable wall comprises a silicone elastomer.

* * * * *

UNITED STATES PATENT OFFICE
CERTIFICATE OF CORRECTION

PATENT NO. : 3,911,911
DATED : October 14, 1975
INVENTOR(S) : Antonio Scommegna

It is certified that error appears in the above-identified patent and that said Letters Patent are hereby corrected as shown below:

Column 2, lines 24-25, "(dl-11β-ethyl-17α-ethinyl-17β-hydrogen-4-ene-3-one)" should be --(dl-13β-ethyl-17α-ethinyl-17β-hydroxygon-4-ene-3-one)--

Column 2, line 33, correct misspelling of "the"

Column 2, line 36, correct spelling of "distorted"

Column 2, line 58, "1,57" should be --1.57--

Column 5, line 40, "Silicones" should be in italics.

Signed and Sealed this tenth Day of February 1976

[SEAL]

Attest:

RUTH C. MASON
Attesting Officer

C. MARSHALL DANN
Commissioner of Patents and Trademarks